US008848032B2

(12) United States Patent
Yamaji

(10) Patent No.: US 8,848,032 B2
(45) Date of Patent: Sep. 30, 2014

(54) IMAGING DEVICE, IMAGING METHOD, AND COMPUTER-READABLE MEDIUM

(75) Inventor: Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 508 days.

(21) Appl. No.: 13/077,115

(22) Filed: Mar. 31, 2011

(65) Prior Publication Data
US 2011/0242274 A1 Oct. 6, 2011

(30) Foreign Application Priority Data

Mar. 31, 2010 (JP) ................................ 2010-082363

(51) Int. Cl.
H04N 7/00 (2011.01)
H04N 5/232 (2006.01)
G06T 3/40 (2006.01)

(52) U.S. Cl.
CPC .......... H04N 5/23238 (2013.01); G06T 3/4038 (2013.01)
USPC ........ 348/36; 375/240; 375/240.13; 382/154; 348/78

(58) Field of Classification Search
USPC .................................... 348/31–161
See application file for complete search history.

(56) References Cited

U.S. PATENT DOCUMENTS

| 5,477,303 | A | * | 12/1995 | Goto .............................. 396/114 |
| 6,081,551 | A | * | 6/2000 | Etoh .............................. 375/240 |
| 6,392,658 | B1 | | 5/2002 | Oura |
| 6,549,650 | B1 | * | 4/2003 | Ishikawa et al. .............. 382/154 |
| 8,068,693 | B2 | * | 11/2011 | Sorek et al. ................... 382/284 |
| 8,264,583 | B2 | * | 9/2012 | Yamaji et al. ............ 348/333.02 |
| 8,294,748 | B2 | * | 10/2012 | Stec et al. ........................ 348/36 |

| 2001/0028398 | A1 | * | 10/2001 | Takahashi ...................... 348/232 |
| 2008/0180520 | A1 | * | 7/2008 | Chang et al. .................... 348/36 |
| 2009/0021576 | A1 | * | 1/2009 | Linder et al. .................... 348/36 |
| 2009/0022422 | A1 | * | 1/2009 | Sorek et al. ................... 382/284 |
| 2010/0260423 | A1 | * | 10/2010 | Matsuhira ..................... 382/195 |
| 2011/0050960 | A1 | * | 3/2011 | Niemi et al. ................... 348/239 |
| 2011/0141300 | A1 | * | 6/2011 | Stec et al. .................. 348/222.1 |

FOREIGN PATENT DOCUMENTS

| JP | 11-168689 | 6/1999 |
| JP | 2000-90232 | 3/2000 |
| JP | 2001-333327 | 11/2001 |
| JP | 2003-110983 | 4/2003 |
| JP | 2004-128683 | 4/2004 |
| JP | 2008-504758 | 2/2008 |
| JP | 2008-098754 | 4/2008 |
| JP | 2008-288798 | 11/2008 |
| WO | 2006/002796 | 1/2006 |

OTHER PUBLICATIONS

Notification of Reasons for Refusal issued Apr. 30, 2013 by the Japanese Patent Office in corresponding Japanese Patent Application No. 2010-082363 with English translation, 7 pages.

* cited by examiner

Primary Examiner — Joseph Ustaris
Assistant Examiner — Talha Nawaz
(74) Attorney, Agent, or Firm — Young & Thompson

(57) ABSTRACT

The imaging device includes a template selector, a synthesis area selector for selecting a synthesis area for panoramic image in the selected template, a moving image acquiring unit, a detector for detecting/outputting the movement of the imaging device as movement information, a panoramic image producer for producing the panoramic image being a still image corresponding to the synthesis area from the moving images and the detected movement, a synthesized image producer for sequentially synthesizing the panoramic image into the synthesis area during moving image acquisition to produce/renew a synthesized image, a display for sequentially displaying the produced/renewed synthesized image on a display screen, and a storage for storing the template and the moving images, the panoramic image, and/or the synthesized image.

14 Claims, 13 Drawing Sheets

IMAGING DEVICE, IMAGING METHOD, AND COMPUTER-READABLE MEDIUM

BACKGROUND OF THE INVENTION

The present invention relates to an imaging device, an imaging method, and a computer-readable medium or memory encoding a program for producing a panoramic image suited to a template synthesis print.

As recent digital still cameras acquire enhanced performance, some of those on the market are now capable of recording high-resolution moving images. Accordingly, there are demands for cutting out still images including panoramic images from moving images to print them or produce a photograph album. There have been proposed a variety of methods for acquiring a panoramic image including one providing imaging assist whereby a plurality of acquired still images are joined.

For example, as illustrated in FIG. 20A, JP 2008-98754 A describes producing distinction image data 102 for distinctively displaying an image of at least a region of acquired image data and an image 100 yet to be acquired; moving the display position of the distinction image data 102 in a direction related to the display position of the image yet to be acquired; and displaying the image 100 yet to be acquired and the distinction image data 102 simultaneously. Further, frames 104, 106, and 108 are displayed to show which of the original images for producing a panoramic image is now being acquired. FIG. 20B illustrates a state in which a second of the three images constituting a panoramic image is now being acquired, showing an image 110 representing a region of a first image 104, which corresponds to the distinction image data 102, a second image 112, which is the image 100 yet to be acquired, and a third image region 114. Also displayed are the frames 104, 106, and 108 showing which part is now being acquired.

JP 11-168689 A describes an imaging device capable of readily acquiring an image with a composition matching the template, and permitting changes in the template and desynthesis after recording is completed.

JP 2004-128683 A describes filming a subject to acquire moving image data; detecting information on a trip covered during image acquisition and correlating the trip information to time information related to image acquisition; attaching the trip information and the corresponding time information to the image data; storing the thus produced image data; extracting the trip information from the recorded image after image acquisition is terminated; and processing a plurality of frames of images of the image data to produce a panoramic image based on the trip information and the corresponding time information.

FIGS. 21A and 21B illustrate an example of production of a synthesized image using a layout. A screen 120 illustrated in FIG. 21A shows a template selection screen 122. When a template is selected, a selected template 124 is shown on the screen 120 as illustrated in FIG. 21B, and an acquired image from among a group of acquired images 128 is placed in a synthesis area 126 to obtain a synthesized image.

SUMMARY OF THE INVENTION

However, in a case where a plurality of still images are acquired to produce a panoramic image as in JP 2008-98754, an appropriate panoramic image cannot be produced unless the photographer considers a composition himself/herself when acquiring a second photograph and onward. Further, when the photographer is moving as when he/she is traveling in a vehicle, for example, the photographer continues to move and thus the distance from a subject continues to change, making it practically difficult to acquire a panoramic image.

The imaging device described in JP 11-168689 A is solely intended for obtaining a synthesized image from the template and still images and does not consider obtaining a panoramic image composed of still images extracted from moving images.

JP 2004-128683 A enables a panoramic image to be obtained from still images extracted from moving images but there are cases where the imaging device therein described failed to allow the user to know during image acquisition whether a panoramic image obtained is appropriate for the synthesis areas in the template synthesis print and a photograph album, until the user finds upon processing that the panoramic image cannot be used for a photograph album or the like.

For example, although panoramic images produced from moving images may be used in a photograph album and a template print, adding attractiveness as in FIGS. 1A to 1C, it is not that an appropriate panoramic image can be produced from any moving images. Thus, if the user acquires moving images during a trip, returns home, and finds upon reproducing panoramic images that the panoramic images are failed images as illustrated in FIG. 2, acquisition of appropriate moving images is no longer possible. Thus, there have been demands that verification by the user be made possible to see what panoramic image is produced while acquiring moving images.

An object of the present invention is to provide an imaging device, an imaging method, and a computer-readable medium or memory encoding a program enabling verification during image acquisition as to whether an acquired panoramic image is appropriate for a synthesis area in a template synthesis print and a photograph album. Another object of the present invention is to provide an imaging device, an imaging method, and a program providing imaging assist in acquiring a panoramic image that is optimal for a synthesis area in a template synthesis print and a photograph album.

In order to attain the object of the present invention there is provided with an imaging device comprising: a template selector that selects a template; a synthesis area selector that selects a synthesis area for a panoramic image in the selected template; a imaging unit that acquires moving images; a movement detector that detects a movement of said imaging device and outputs the detected movement as movement information; a panoramic image producer that produces a panoramic image being a still image corresponding to said synthesis area for the panoramic image based on the moving images and the detected movement of said imaging device; a synthesized image producer that sequentially synthesizes the panoramic image that is being produced into the synthesis area for the panoramic image during acquisition of the moving images to produce and renew a synthesized image; a display unit that sequentially displays the synthesized image that is produced and synthesized on a display screen; and a storage unit that stores the template and one or more of the moving images, the panoramic image, and the synthesized image.

Preferably, said display unit displays a through-image and the synthesized image.

Preferably, when a length of the panoramic image in a production direction coincides with a length of the synthesis area, the acquisition of the moving images by said imaging unit and production of the panoramic image by said panoramic image producer are terminated.

Preferably, when a length of the panoramic image in a production direction exceeds a length of the synthesis area, a newly produced image is added on said display screen to a first side of the synthesis area opposite to a second side of the synthesis area from which the acquisition of the moving images has been started, and the panoramic image having a same width as the newly produced image that is added is removed on said display screen from the second side of the synthesis area from which the acquisition of the moving images has been started to display the panoramic image as shifted in the synthesis area.

Preferably, when a length of the panoramic image in a production direction exceeds a length of the synthesis area, the panoramic image that is being produced is displayed in a reduced size with a fixed pixel aspect ratio.

Preferably, when the acquisition of the moving images is terminated with a length of the panoramic image in a production direction less than a length of the synthesis area in the production direction, the template is corrected.

Preferably, the template is so corrected that the length of the synthesis area in the production direction is reduced to a same length as the panoramic image and a new synthesis area is added.

Preferably, the template is so corrected that the synthesis area is moved to a center of the template in the production direction of the panoramic image.

Preferably, when a production direction of the panoramic image is changed, a shape of the synthesis area is changed according to the changed production direction.

Preferably, imaging assist in acquiring the panoramic image is provided by displaying on said display screen of said display unit a message or an arrow to indicate a production direction of the panoramic image.

Preferably, a position for starting the acquisition of the panoramic image is set by selecting a side normal to a production direction in the synthesis area or selecting a neighborhood of the side.

Preferably, one or more of the template selected by said template selector and the synthesis area selected by said synthesis area selector are selected through a input unit.

In order to attain the object of the present invention there is provided with an imaging method, comprising: a template selecting step of selecting a template; a synthesis area selecting step of selecting a synthesis area for a panoramic image in the selected template; an imaging step of acquiring moving images with a imaging unit; a movement detecting step of detecting a movement of a imaging device having said imaging unit and outputting the detected movement as movement information; a panoramic image producing step of producing a panoramic image being a still image corresponding to the synthesis area for the panoramic image based on the moving images and the detected movement of said imaging device; a synthesized image producing step of sequentially synthesizing the panoramic image that is being produced into the synthesis area for the panoramic image during acquisition of the moving images to produce and renew a synthesized image; a displaying step of sequentially displaying the synthesized image that is produced and renewed; and a storing step of storing the template and one or more of the moving images, the panoramic image, and the synthesized image.

In order to attain the object of the present invention there is provided with a computer-readable medium or memory encoding a program for causing a computer to execute the steps of the imaging method described above.

According to the present invention, whether an acquired panoramic image is appropriate for a synthesis area in a template synthesis print and a photograph album can be verified during image acquisition. Further, the imaging assist provided in accordance with the template prevents failure in acquiring a panoramic image and enables production of synthesized image data for an attractive template synthesis print or photograph album.

DETAILED DESCRIPTION OF THE INVENTION

The following describes in detail the imaging device of the present invention for implementing the imaging method of the invention based upon the preferred embodiments illustrated in the accompanying drawings.

Figure 1A:
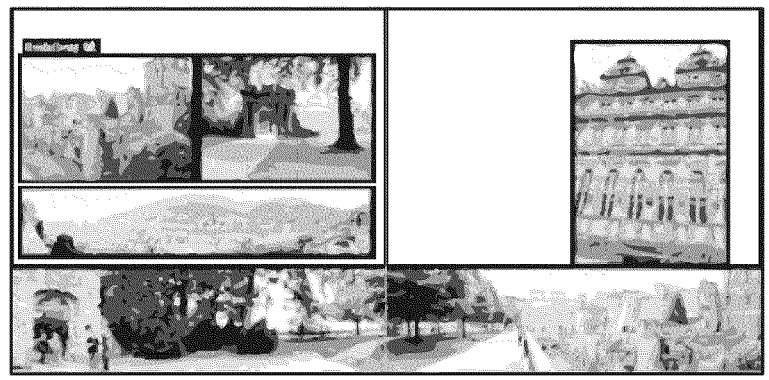
FIGS. 1A to 1C are views for explaining examples of photograph albums produced using the imaging device of the invention.
Figure 1B:
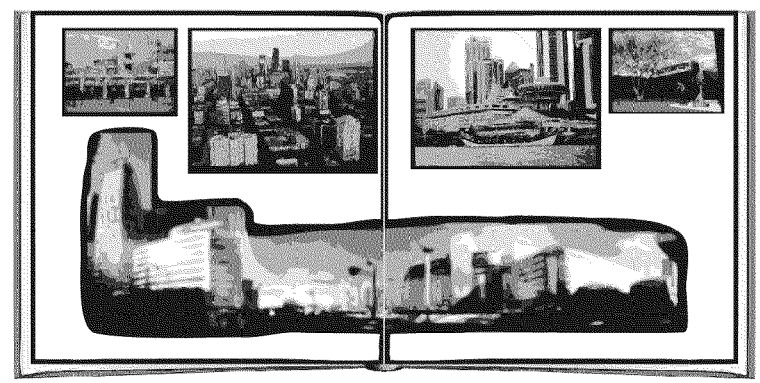
Figure 1C:
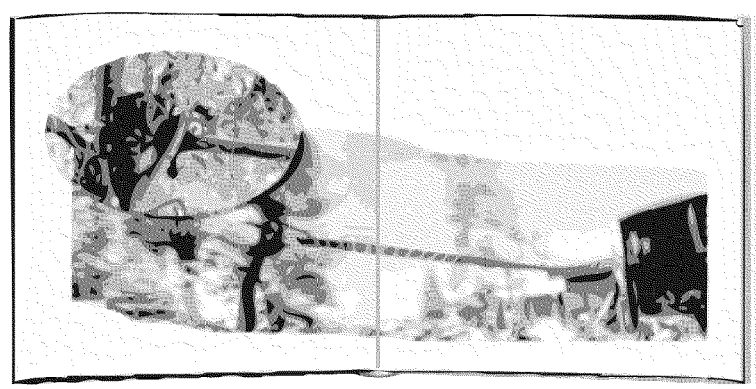
Figure 2:
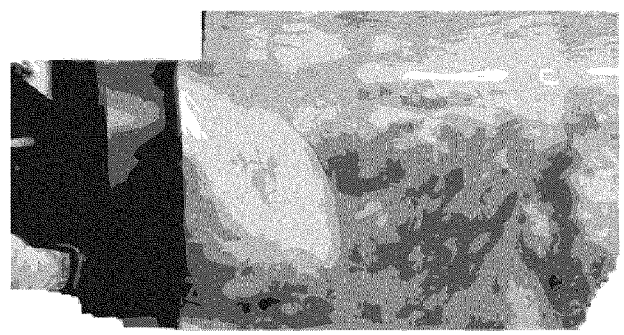
FIG. 2 is a view for explaining an example of a failed panoramic image.
Figure 3:
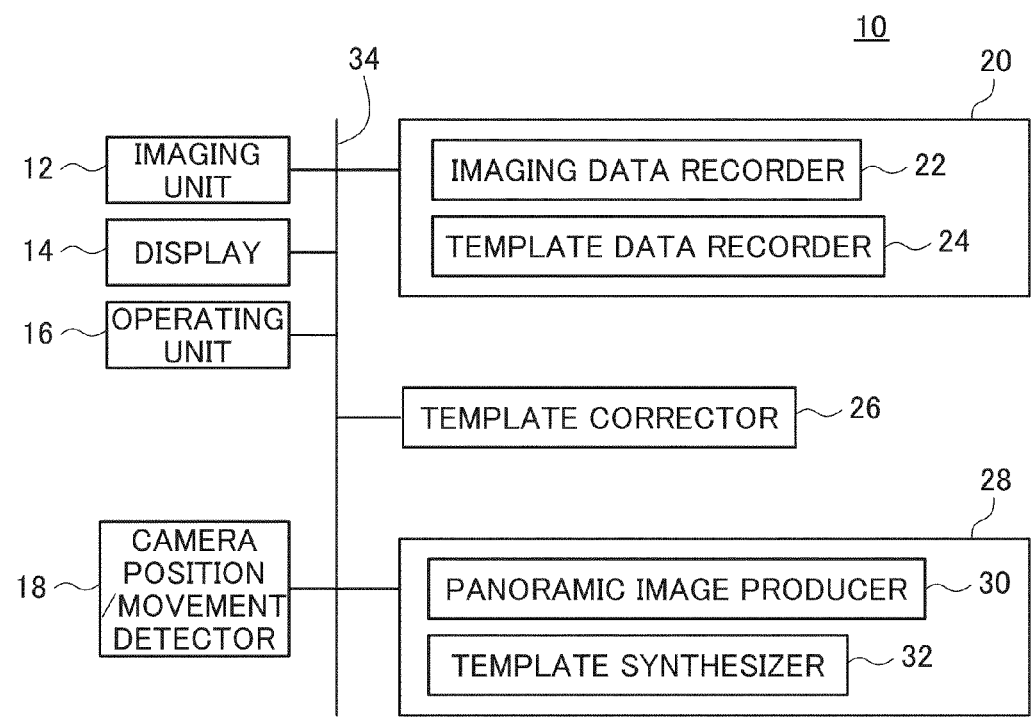
FIG. 3 is a block diagram showing an example of a configuration of the imaging device of the invention for implementing the imaging method of the invention.

FIG. 3 is a block diagram showing an example of the configuration of the imaging device of the present invention.

An imaging device 10 illustrated in FIG. 3 comprises an imaging unit 12, a display 14, an operating unit 16, a camera position/movement detector 18, a recorder 20, a template corrector 26, and an image processor 28, all these being connected by a bus 34. The recorder 20 comprises an imaging data recorder 22 and a template data recorder 24. The image processor 28 comprises a panoramic image producer 30 and a template synthesizer 32.

The imaging unit 12 is imaging means for acquiring moving images and still images and comprises lenses, a diaphragm, an image sensor, and the like. The image sensor may be a CCD (Charge Coupled Device) image sensor, CMOS (Complementary Metal Oxide Semiconductor) image sensor, and the like. The image of a subject is formed on the image sensor through the lens, converted photoelectrically, and outputted as moving image data or still image data.

The display 14 shows a through-image (moving images) outputted from the imaging unit 12, an operation screen such as a template selection screen, and a template among others. The display 14, which displays a through-image, also serves as a viewfinder when acquiring an image. When acquiring images to produce a panoramic image, the display sequentially shows synthesized images in a template as they are acquired.

The operating unit 16, comprising a release button for taking a photograph, switches, and a touch panel, is a input unit operated by a photographer to enter instructions to the imaging device. For the photographer to select a template and a synthesis area, the operating unit 16 forms a template selector together with the display 14 showing the template selection screen and forms a synthesis area selector together with the display 14 showing a template. The operations for which instructions have been entered are outputted as operation information. The template and synthesis area may be automatically selected.

The camera position/movement detector 18 is a movement detector for detecting the position and/or movement of the imaging device. To detect the position of the imaging device, position detection by means of GPS (Global Positioning System) and wireless LAN (Local Area Network) may be used; to detect the movement of the imaging device, a three-dimensional gyro, a three-axis acceleration sensor, and the like may be used. Alternatively, the movement may be detected from the results of the position detection. The detected movement of the imaging device is outputted as movement information.

The movement may also be calculated by analyzing acquired moving images.

The imaging data recorder 22 is a storage unit for recording moving image data or still image data outputted from the imaging unit 12. The imaging data recorder 22 also records movement information outputted from the camera position/movement detector 18 in addition to the moving image data. The imaging data recorder 22 further records synthesized image data wherein all the synthesis areas in the template have been allocated an image, which synthesized image data is final output image data outputted from the template synthesizer 32 described later; panoramic image data produced from moving image data; thumb-nail image data produced from individual image data, and the like.

The template data recorder 24 is a storage unit for recording template data. A template selected by the user is read out according to the operation information entered from the operating unit 16. The template corrected by the template corrector 26 described later is recorded.

When a synthesized panoramic image is larger or smaller than the synthesis area originally set in the template, the template corrector 26 corrects the template so as to suit the panoramic image. For example, when the panoramic image is smaller than the synthesis area, and when a new synthesis area can be added to a region not filled by the panoramic image, then a new synthesis area is added, whereas when the synthesis area is smaller than the panoramic image, the position of the panoramic image is corrected so that the panoramic image is located at the center of the template.

When a panoramic image is synthesized to a size beyond the original synthesis area, for example, upwardly, correction is made so that the area exceeding the synthesis area is contained in a synthesis area for the panoramic image.

The image processor 28 generally comprises a panoramic image producer 30 and a template synthesizer 32 and also performs thumb-nail image data production and filter processing, among others.

The panoramic image producer 30 is a panoramic image producer for producing and outputting a panoramic image, a still image, corresponding to a synthesis area of the panoramic image in the template based on the moving image data outputted from the imaging unit 12 and the movement information outputted from the camera position/movement detector 18.

A panoramic image may be produced for example by a method described in JP 2004-128683 A filed by the Applicant of the present application. Specifically, the travel direction and the travel amount of the imaging device 10 resulting from image acquisition may be calculated from movement information including the tilt of the imaging device 10 obtained by a three-dimensional gyro during acquisition of still and moving images, the acceleration acting on the imaging device 10 obtained by a three-axis acceleration sensor, the zoom factor of the lens, and a moving image acquisition time length of each frame. Then, from the calculated travel direction and travel amount, the overlap regions between the frames of the moving image data are calculated, and the images of the frames from which the overlap regions have been removed are combined to produce a panoramic image.

A panoramic image having a reduced accuracy for showing the synthesis result on the display 14 on a real-time basis during image acquisition may be used in addition to the panoramic image for synthesis with the template used for printing. Such a panoramic image with a reduced accuracy may be produced by, for example, lowering the resolution, or by extracting frames from the moving images at longer intervals, say 2 frames/s as compared with 10 frames/s for a panoramic image used for printing.

The template synthesizer 32 is a synthesized image producer for sequentially combining panoramic images being produced that are synthesized in the template and the synthesis areas during image acquisition to produce and renew a synthesized panoramic image and sequentially output a synthesized image. Now, the panoramic image combined with the template during image acquisition may be readily real-time processed by lowering its accuracy. When acquisition or arrangement of images for all the synthesis areas in the template is completed, the template synthesizer 32 produces and outputs synthesized image data that is finally outputted for printing or other purposes.

Now, we will describe the operations of the imaging device of the invention for implementing the imaging method of the invention.

Example 1

Figure 4:
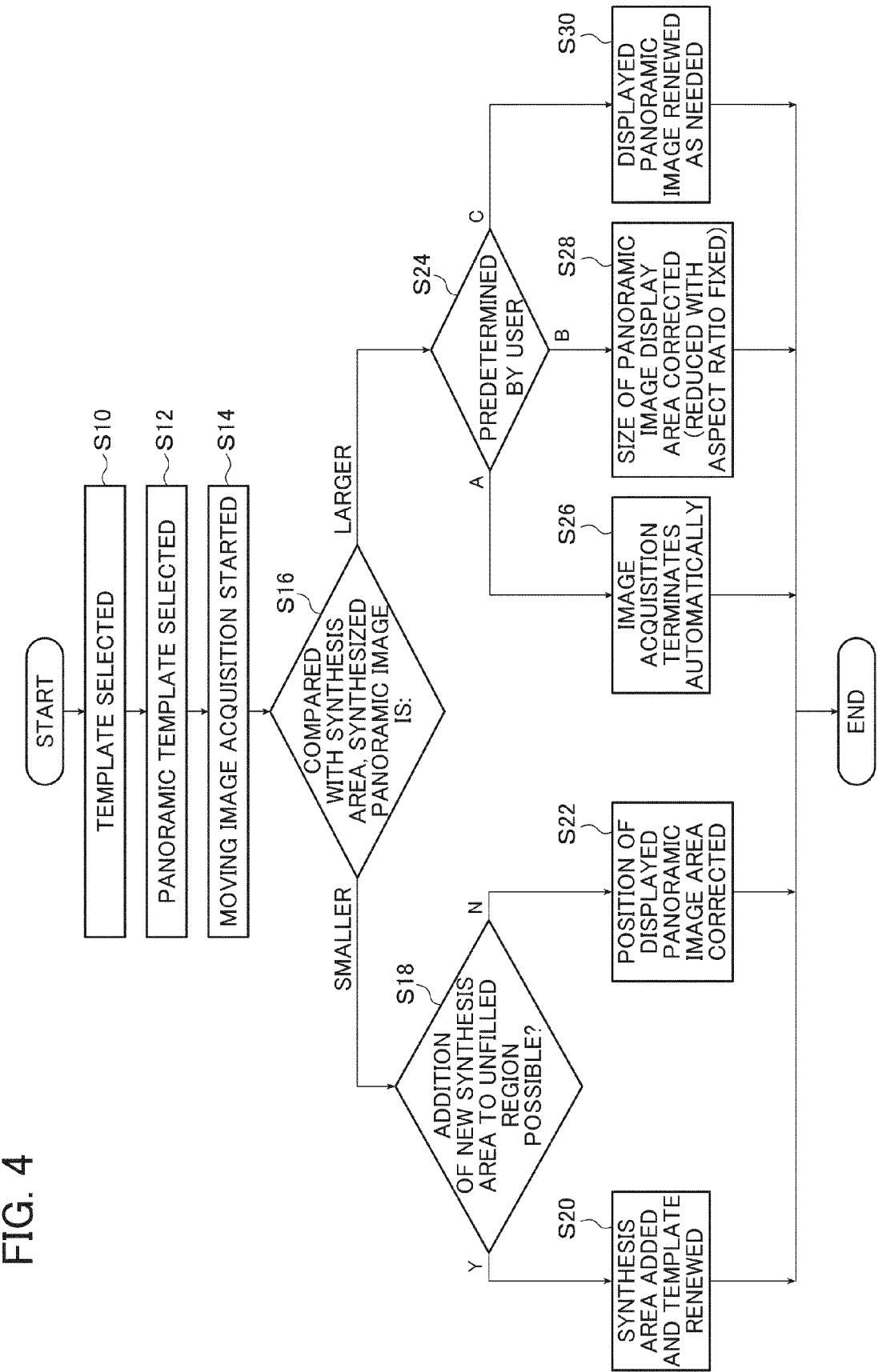
FIG. 4 is a flowchart illustrating an example of the flow of the imaging method of the present invention.

FIG. 4 is a flowchart illustrating an example of the flow of the imaging method of the present invention.

Figure 5A:
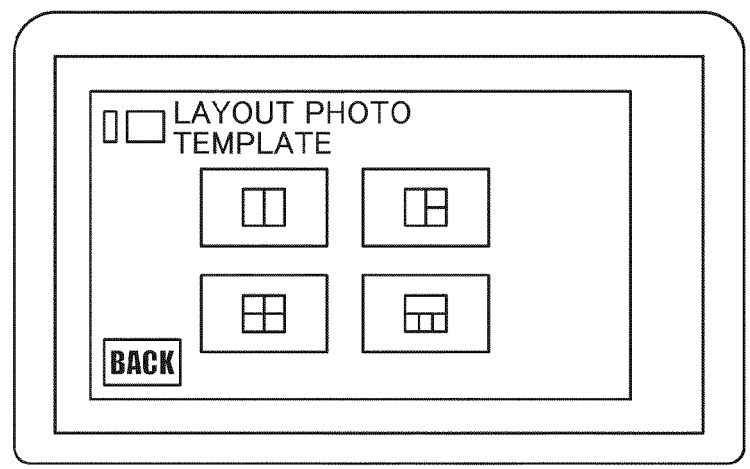
FIG. 5A is a view for explaining an example of a template selection screen of the imaging device of the invention.
Figure 5B:
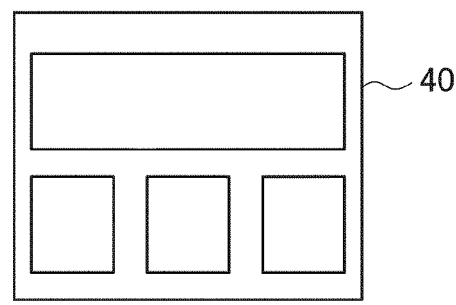
FIG. 5B is a view for explaining a selected template.
Figure 6:
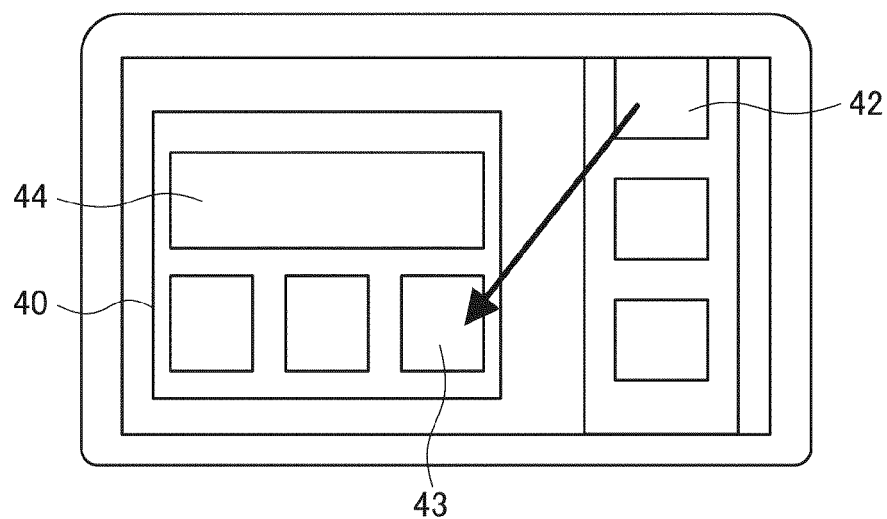
FIG. 6 is a view for explaining an example of selecting still images from an image list area and arranging them in a template.

First, the user operates the touch panel provided on the display 14 (operating unit 16) to select a template 40 illustrated in FIG. 5B having a synthesis area for producing a panoramic image from the template selection screen shown in FIG. 5A (step S10). As illustrated in FIG. 6, a synthesis area to be allocated a normal size still image (e.g., a synthesis area 43) among the synthesis areas in the template 40 is allocated a still image from an image list area (e.g., still image 42).

Then, the user selects a synthesis area 44 for a panoramic image in the template 40 (step S12), whereupon the imaging device 10 is placed in a panoramic moving image acquisition mode and starts to acquire moving images for a panoramic image (step S14). When moving image acquisition is started, the user moves the imaging device 10 horizontally from left to right, for example. The camera movement is detected by the camera position/movement detector 18 and recorded in the imaging data recorder 22 as movement information together with the moving image data.

Figure 7A:
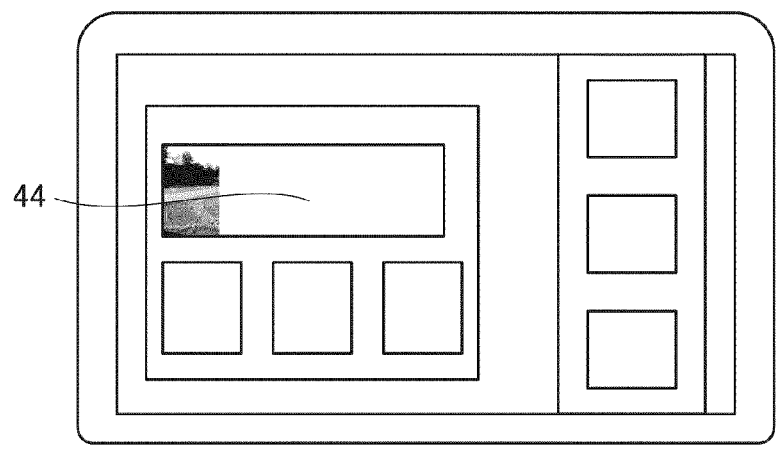
FIGS. 7A to 7C are views chronologically illustrating acquisition of moving images and synthesis of a panoramic image achieved by the imaging device of the invention.
Figure 7B:
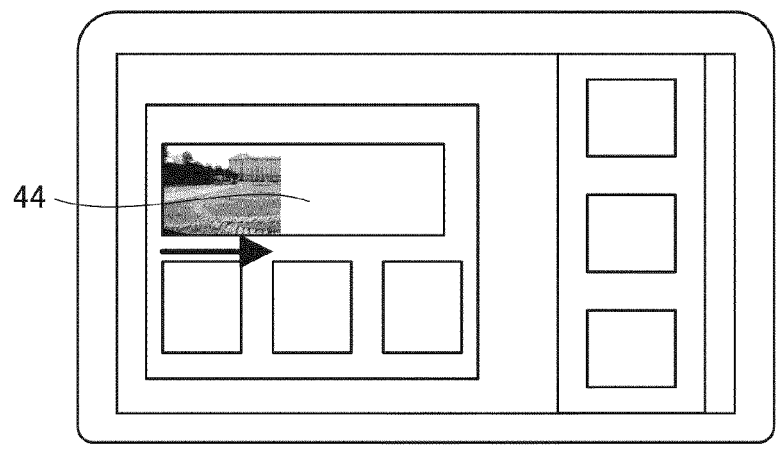
Figure 7C:
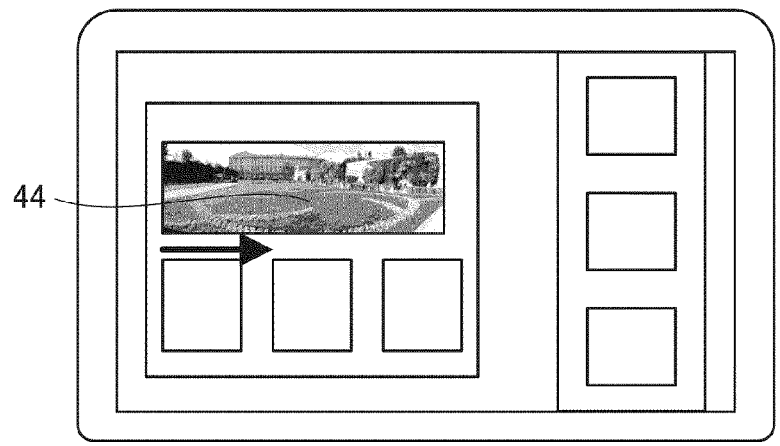

As the imaging device 10 is horizontally moved from left to right, the panoramic image producer 30 produces a panoramic image from the acquired moving image data. The template synthesizer 32 combines the sequentially produced panoramic image and the template, whereupon as illustrated in FIGS. 7A to 7C, a panoramic image is displayed as it is sequentially synthesized from left to right in the panoramic image synthesis area. If the user has started to move the imaging device 10 in one direction and then reverses the movement direction, a normal panoramic image cannot be produced. Therefore, a warning is preferably given when the user makes such a movement.

Figure 9A:
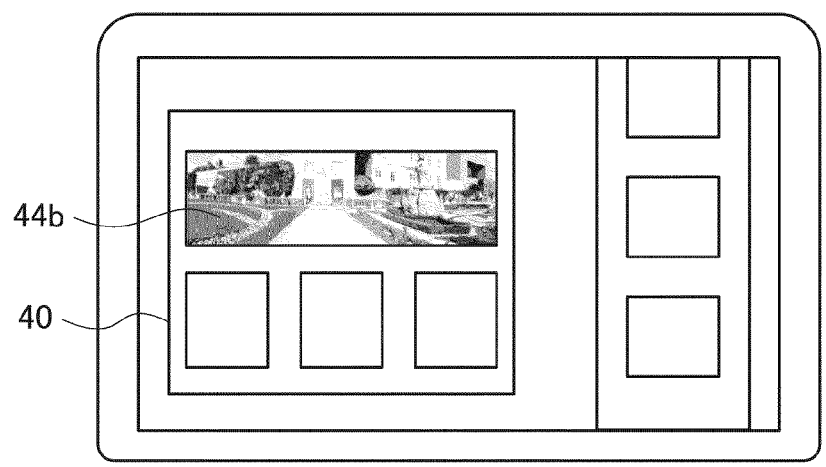
FIG. 9A is a view for explaining an example where a panoramic image is shown all the way through the right end of the template and where the displayed portion continues to be shifted.
Figure 9B:
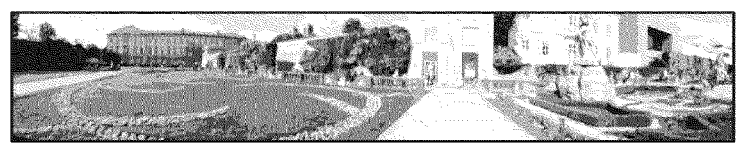
FIG. 9B is a view for explaining an example of synthesized data of an actual panoramic view.

When a produced panoramic image has reached the end of the synthesis area in the template ("larger" in the step S16), an operation predetermined by the user is performed (step S24). Where the settings previously made by the user are for the image acquisition to terminate automatically (step S24 in "A"), panoramic image acquisition terminates automatically when the length of the panoramic image in the production direction coincides with the length of the synthesis area (step S26), whereupon synthesized images including a panoramic image are produced, and the panoramic image data and synthesized image data are recorded in the imaging data recorder 22.

Where the settings previously made by the user are for the image to be reduced in size so that the whole image can be displayed ("B" in the step S24), the size of the synthesis area is corrected sequentially to contain the whole acquired panoramic image within the template 40, so that a panoramic image reduced in size with a fixed pixel aspect ratio is sequentially displayed in a synthesis area 44a (step S28). That is, when the length of the panoramic image in its production direction exceeds the length of the synthesis area, a reduced-size display is started. The user performs an operation to terminate image acquisition, whereupon synthesized images including a panoramic image are produced, and the panoramic image data and synthesized image data are recorded in the imaging data recorder 22.

Where the settings previously made by the user are for the displayed panoramic image to be renewed and displayed ("C" in the step S24), the panoramic image is renewed so that the size of a synthesis area 44b is not changed and the panoramic image displayed in the synthesis area 44b is shifted leftward (step S30) as illustrated in FIG. 9A. In other words, when the length in the panoramic image production direction exceeds the length of the synthesis area 44b in the production direction, a newly produced image is added onto the right end of the synthesis area 44b while the length on the left side of the synthesis area 44b having the same width as the newly produced and added image is removed. The user performs an operation to terminate image acquisition, whereupon synthesized images including a panoramic image are produced, and the panoramic image data and synthesized image data are recorded in the imaging data recorder 22. The actual panoramic image thus produced is wider than the synthesis area 44b as illustrated in FIG. 9B. Therefore, after image acquisition, the user can make an adjustment as to which area of the panoramic image is to be included in the synthesis area 44b.

Figure 8:
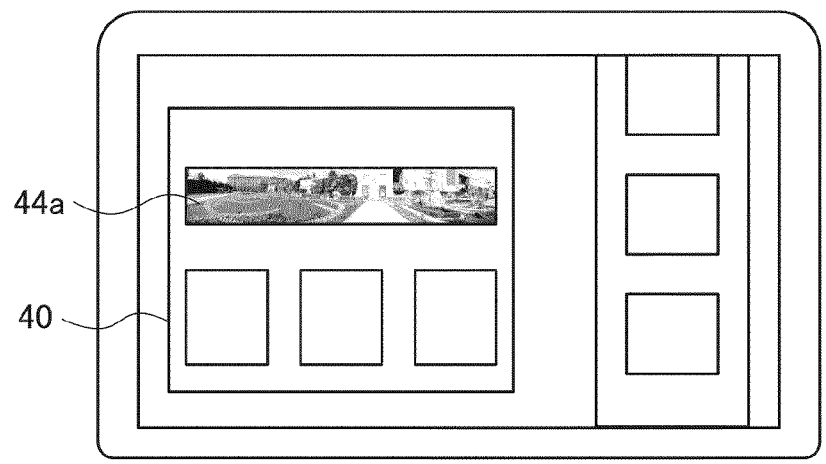
FIG. 8 is a view for explaining an example, where a panoramic image is shown all the way through the right end of the template and where the panoramic image is reduced in size with the aspect ratio of the pixels fixed to display the whole panoramic image.
Figure 10:
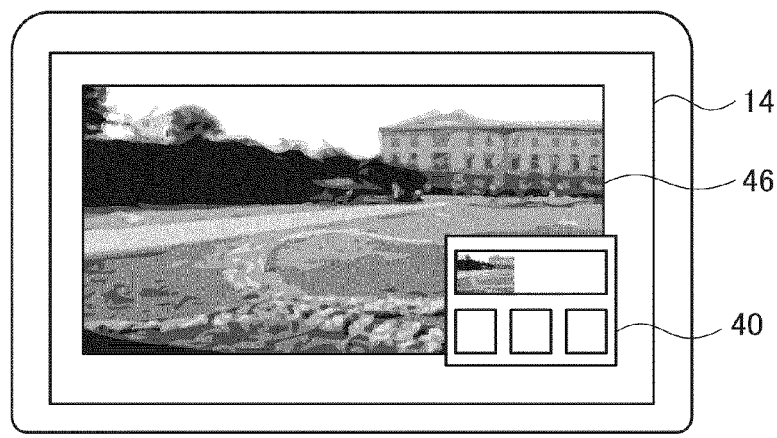
FIG. 10 is a view for explaining an example for displaying how images in a template are combined into a panoramic image, while a through-image is displayed in the background.

The display provided by the display 14 during acquisition of moving images for a panoramic image may be such that a panoramic image being produced is displayed in the synthesis area of the template 40 as illustrated in FIGS. 7 to 9 or may be such that the template 40 is displayed in a part of the display 14 to show how the panoramic image is being produced against a through-image 46 shown in the display 14 as illustrated in FIG. 10. Further, the through-image may be shown behind the template 40 in FIGS. 7 to 9. The through-image 46 displayed facilitates recognition by the user as to which part of the image is now being acquired and hence enables a still more appropriate panoramic image to be produced.

Figure 11A:
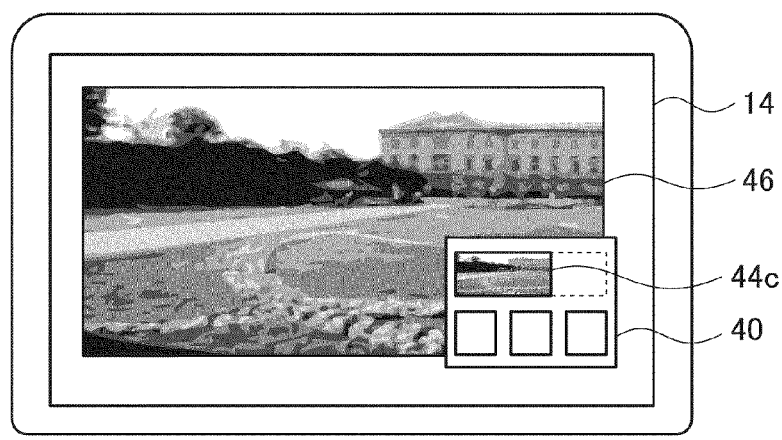
FIG. 11A is a view for explaining an example of a state where synthesis of a panoramic image has been discontinued halfway through the process.
Figure 11B:
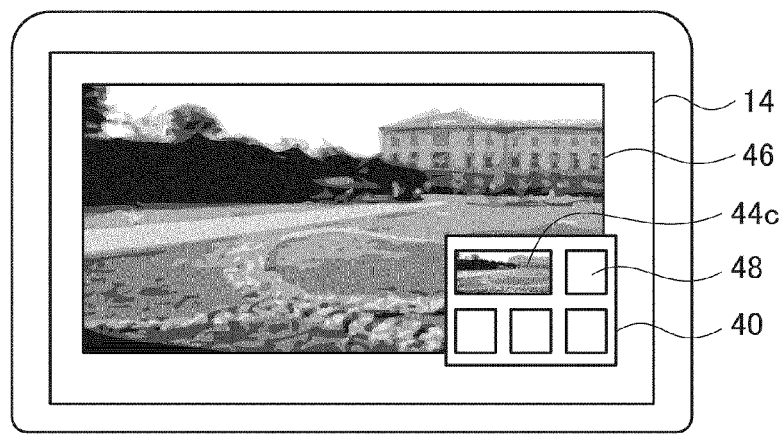
FIG. 11B is a view for explaining an example where another synthesis area has been added to a region left vacant in the panoramic image synthesis area where synthesis was discontinued.

When the user terminates image acquisition before the produced panoramic image reaches the end of the synthesis area in the template ("smaller" in the step S16), that is, when image acquisition is terminated at the time the length of the panoramic image in the production direction falls short of the length of the synthesis area in the production direction, judgment is made as to whether a new synthesis area can be added to the remaining region (region yet to be filled) of the synthesis area for which image acquisition has been terminated halfway through the length (step S18). As illustrated in FIGS. 11A and 11B, when an additional synthesis area 48 can be placed ("Y" in the step S18) in the remaining region of a synthesis area 44c now reduced to the same length as a panoramic image as image acquisition has been terminated halfway through the length, the template corrector 26 adds a synthesis area 48, thus renewing the template 40 (step S20). The panoramic image data and synthesized image data of the synthesis area 44c are recorded in the imaging data recorder 22, and the renewed template 40 is recorded in the template data recorder 24.

Figure 12A:
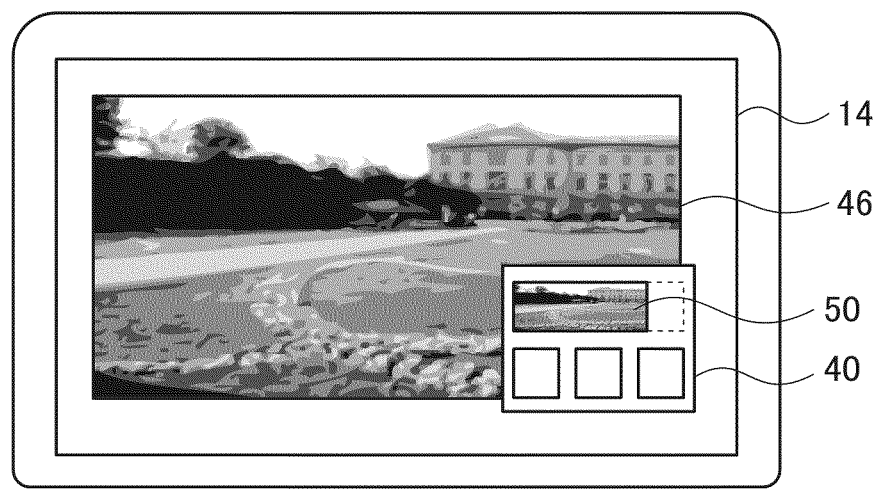
FIG. 12A is a view for explaining another example of a state where synthesis of a panoramic image has been discontinued halfway through the process.
Figure 12B:
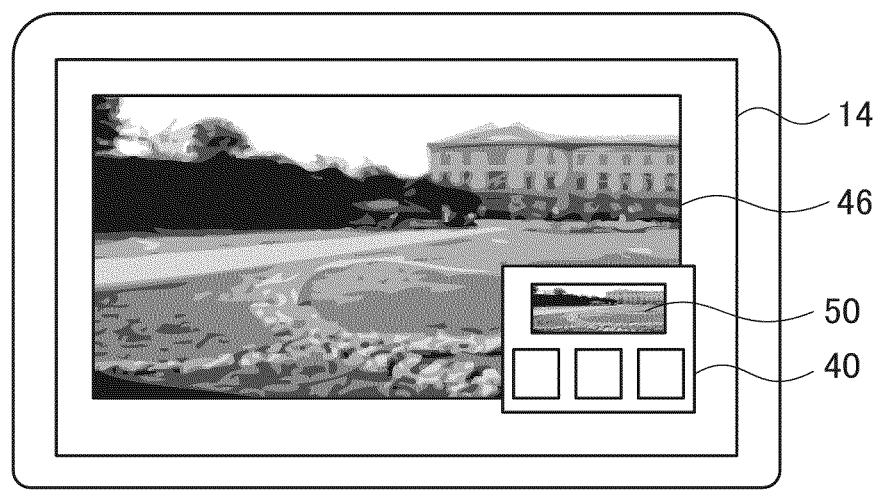
FIG. 12B is a view for explaining an example where the panoramic image synthesis area where synthesis was discontinued has been moved to a central position in the template.

As illustrated in FIGS. 12A and 12B, when an additional synthesis area cannot be placed ("N" in the step S18) in the remaining region of a synthesis area 50 as image acquisition has been terminated halfway through the length, the template corrector 26 corrects the position of the synthesis area 50 to the center of the template 40 (step S22). The panoramic image data and synthesized image data of the synthesis area 50 are recorded in the imaging data recorder 22, and the renewed template 40 is recorded in the template data recorder 24.

Figure 13A:
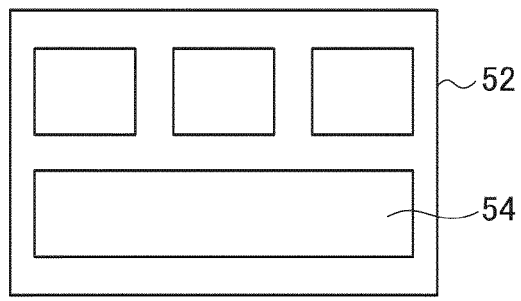
FIGS. 13A to 13E are views for explaining an example illustrating how the template is changed as the image acquisition conditions vary.
Figure 13B:
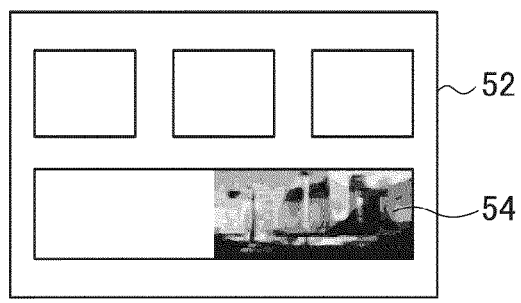
Figure 13C:
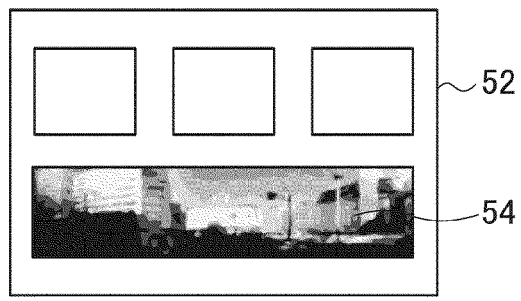
Figure 13D:
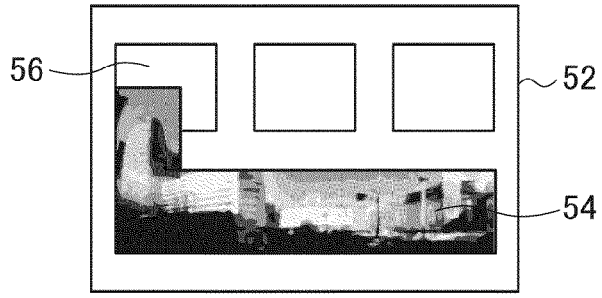
Figure 13E:
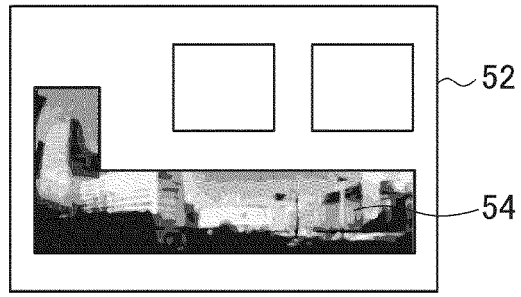
Figure 14:
FIG. 14 are views for explaining an example of a synthesis area changed according to the image acquisition conditions.

The template may be changed as the image acquisition conditions vary. As illustrated in FIGS. 13A to 13E, for example, image acquisition is started at the right end of a synthesis area 54 of a template 52 (FIGS. 13A and 13B), and when a subject is a tall building or the user directs (moves) the imaging device 10 upwardly at the time the image reaches the left end of the synthesis area 54 (FIG. 13C), the original synthesis area 54 is expanded upwardly (see FIG. 13D). Thus, when the production direction of a panoramic image is changed, the shape of the synthesis area is changed according to the production direction. Then, because the panoramic image synthesis area overlaps with a synthesis area 56, the synthesis area 56 is removed to display the expanded synthesis area 54 and the panoramic image (FIG. 13E). Changing the template 52 as the image acquisition conditions vary enables synthesis of an image that better meets the user's requirements. The synthesis area 54 may define the panoramic image with straight lines as illustrated in FIG. 13E or may use images as acquired to define the contour as illustrated in FIG. 14.

Figure 15:
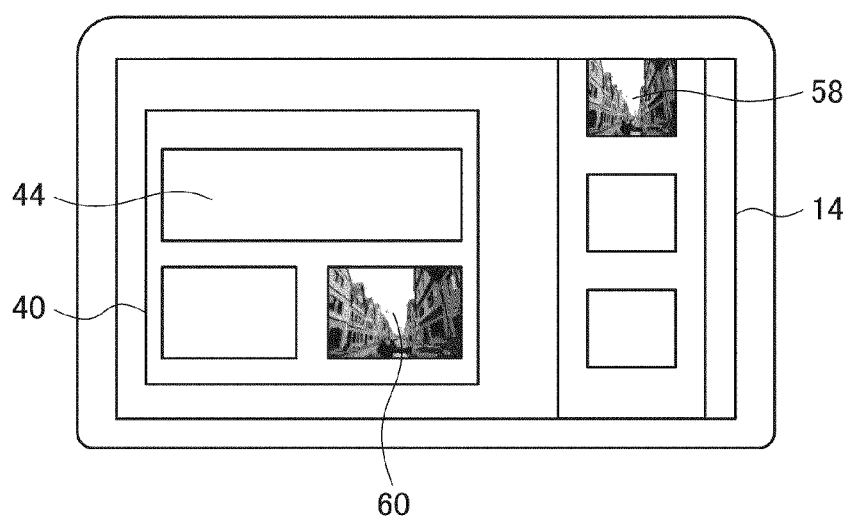
FIG. 15 is a view for explaining an example wherein when another synthesis area has an image allocated therein, changing that synthesis area in the template is made impossible.
Figure 16:
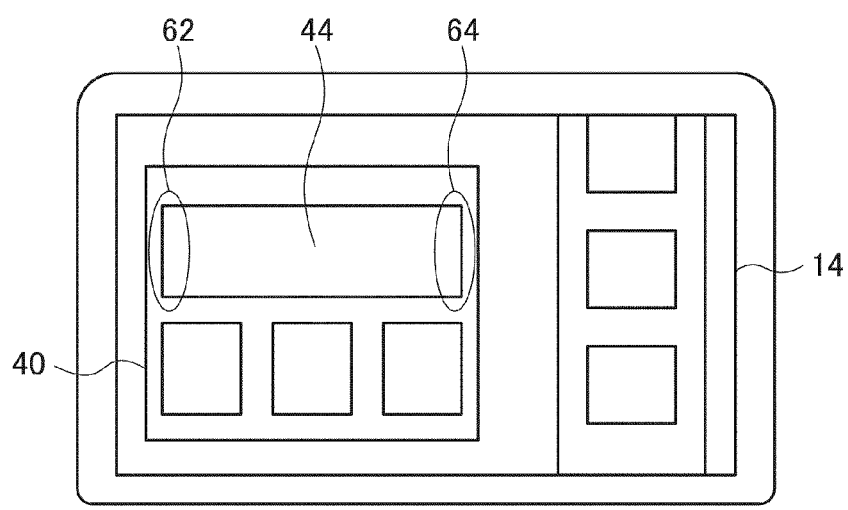
FIG. 16 is a view for explaining an example wherein the starting position for starting panoramic image acquisition is determined by a position touched in the synthesis area for a panoramic image.

Whether a change in the template is allowed may be determined depending on whether another synthesis area already contains an image. For example, where a normal still image (e.g., a still image 58) is already placed in a synthesis area 60 of the template 40 as illustrated in FIG. 15, when the user moves the imaging device 10 in the direction of the synthesis area 60 during acquisition of moving images for a synthesis area 44, the template is not changed, giving a warning instead that a change in the template is not allowed.

When another synthesis area still remains vacant in the template 40, the warning may be followed by positioning of the still image now placed in the synthesis area 60 into that synthesis area remaining vacant while a synthesis area 44 may be expanded in the direction of the synthesis area 60. When the user has moved the imaging device 10 in the direction of a synthesis area where a still image is yet to be placed, the synthesis area 44 may be expanded without a warning. Further, when a clip-art image is placed in the template, a warning of a different kind may be given to notify the user that relocation is not allowed.

Further, acquisition of moving images for a panoramic image may be started using a touch panel (operating unit 16) provided on the display 14 by touching a region 62 at the left end of the synthesis area 44, which is a side normal to the production direction of the synthesis area 44, in which case image acquisition is started from the left side (the imaging device 10 being moved from left to right), or by touching a region 64 at the right end of the synthesis area 44, in which case image acquisition is started from the right side (the imaging device 10 being moved from right to left).

As described above, whether an acquired panoramic image is appropriate for a synthesis area for a template synthesis print and a photograph album can be verified during image acquisition. Further, correction of the template according to an acquired panoramic image enables production of synthesized image data for a yet more attractive template synthesis print and photograph album.

Example 2

The Example 2 is the same as the example 1 except that imaging assist is provided during acquisition of moving images for a panoramic image. Thus, as to the example 2, only the imaging assist will be described, while a description of the other features will be omitted.

Figure 17A:
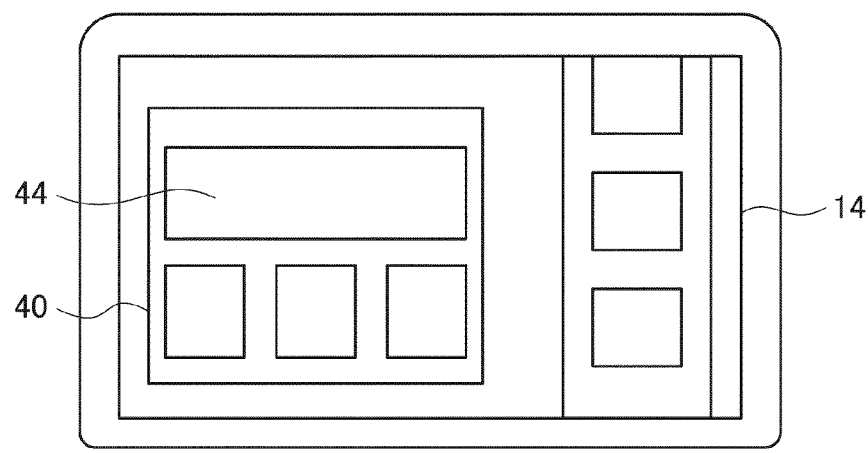
FIG. 17A is a view for explaining an example wherein a synthesis area for which imaging assist is to be provided is selected from a template.
Figure 17B:
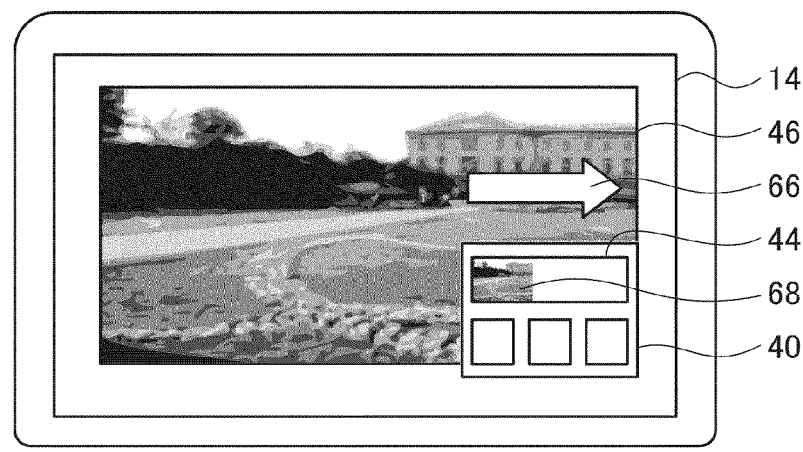
FIG. 17B is a view for explaining an example wherein imaging assist is provided for the synthesis area selected in FIG. 17A.

First, as illustrated in FIG. 17A, the template 40 is selected and a synthesis area 44 for a panoramic image is touched and selected. Upon selection of the synthesis area 44, the display 14 shows the through-image 46, the template 40, and an arrow 66 indicating the direction in which the imaging device 10 is to be moved (i.e., panoramic image production direction) as illustrated in FIG. 17B. Moving images for a panoramic image are acquired as the user moves the imaging device 10 rightwards as indicated by the arrow 66, and a panoramic image 68 now being produced is synthesized and displayed in the template 40. When the panoramic image 68 has reached the right end of the synthesis area 44, image acquisition is terminated, whereupon the panoramic image and the synthesized images are recorded in the imaging data recorder 22. The panoramic image shown on the display 14 need only show the scope of the acquired image and thus may be an image where the information has been thinned out.

The arrow 66 providing imaging assist may have a length or a color that is varied according to the remaining region of the synthesis area 44 so that the user may know the region that remains until a panoramic image is completed. For example, as the image acquisition approaches an end, the arrow 66 may become shorter, turn red, or flash, or sound may produced to notify the user of the remaining region and an end of image acquisition. Alternatively, the arrow 66 may have the same length as the synthesis area 44 so as to show the length for which image acquisition can still be continued or image acquisition assist may be otherwise provided by displaying a message.

Figure 18:
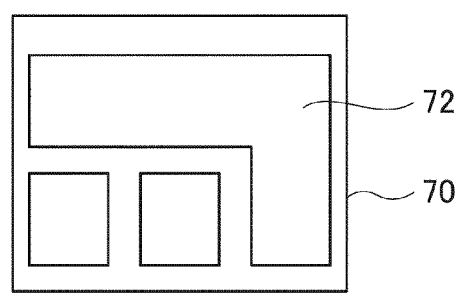
FIG. 18 is a view for explaining another example of template wherein imaging assist is provided.

Further, the synthesis area for a panoramic image may for example be one allowing bidirectional movement as exemplified by a synthesis area 72 of a template 70 illustrated in FIG. 18. When the synthesis area 72 is selected and acquisition of moving images is started from the left end of the synthesis area 72, the imaging assist arrow, initially directed rightwards, turns downwards when the panoramic image reaches the right end of the synthesis area 72. Accordingly, the user can acquire a panoramic image appropriate for the synthesis area 72 by moving the imaging device 10 following the direction of the arrow. When the user moves the imaging device 10 in a different direction than is indicated by the arrow as the arrow changes its direction, a warning is given.

Thus, the imaging assist in accordance with the template prevents failure in acquiring a panoramic image and enables production of synthesized image data for an attractive photograph album or template print.

Figure 19:
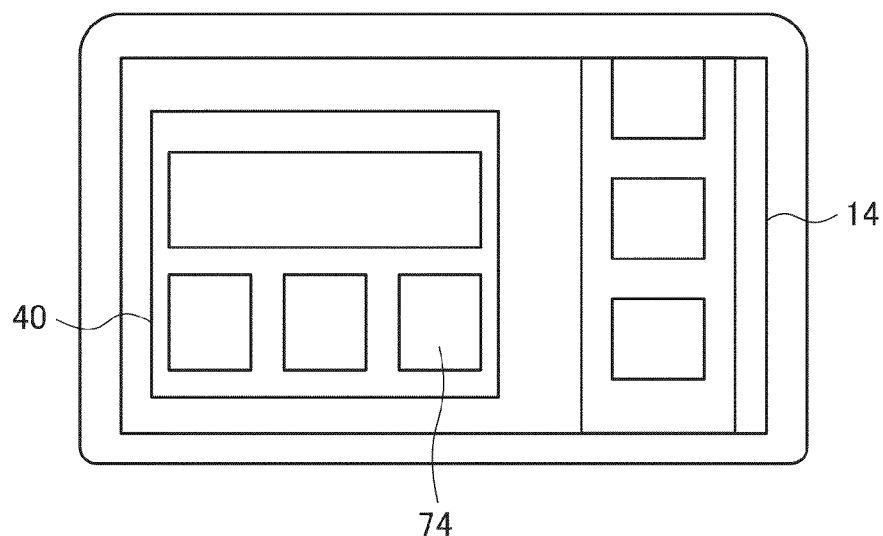
FIG. 19 is a view for explaining an example wherein a synthesis area for a normal image is touched to start a still image acquisition mode.
Figure 20A:
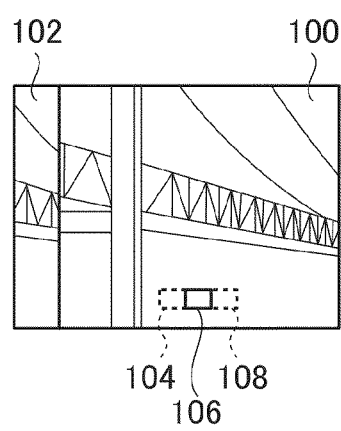
FIGS. 20A and 20B are views for explaining an example of a conventional method of acquiring a panoramic image.
Figure 20B:
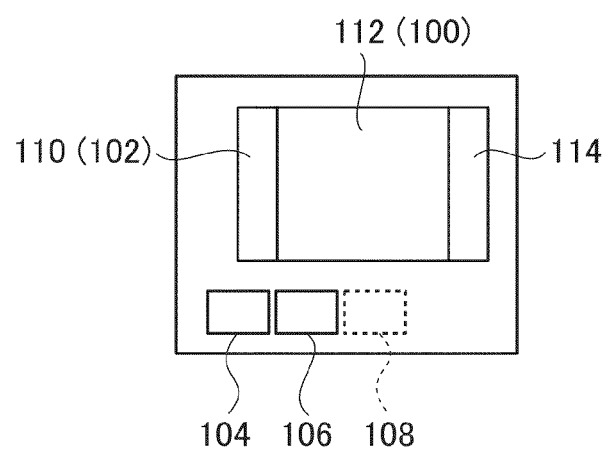
Figure 21A:
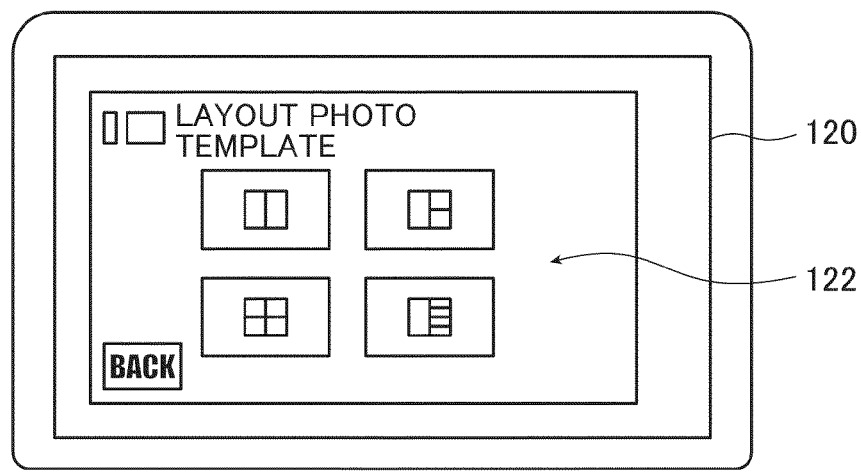
FIGS. 21A and 21B are views for explaining an example of a method of acquiring a panoramic image using a conventional layout.
Figure 21B:
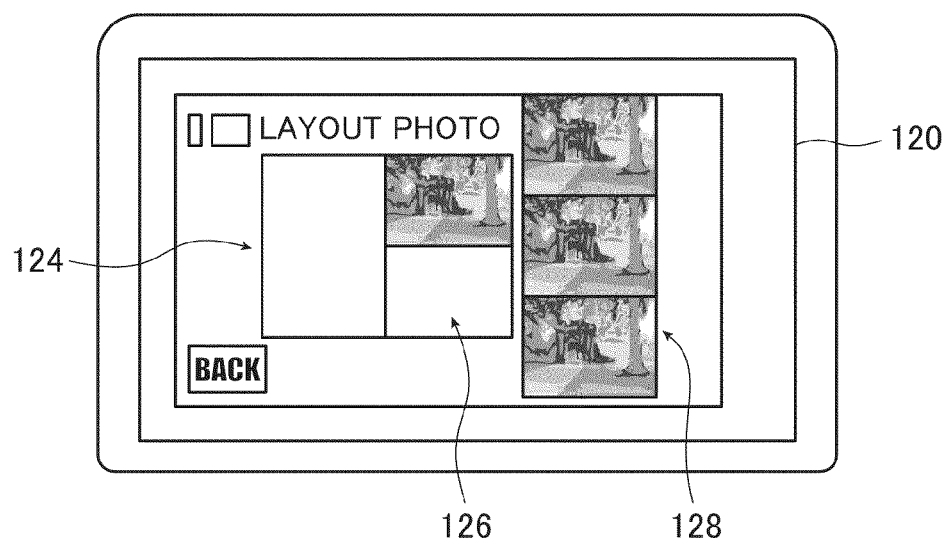

As illustrated in FIG. 19, not only may a synthesis area 74 for a normal image in the template 40 be allocated a still image from among those already acquired but a still image acquisition mode may also be started when the synthesis area 74 is touched as with a panoramic image. In this case, the synthesis area 74 is allocated a still image just acquired, and a synthesized image is produced.

Further, in the above embodiments, production of a panoramic image for printing and production of synthesized images are both performed in the imaging device 10 but the invention is not limited this way; a personal computer or the like may be used to produce a panoramic image for printing and produce synthesized images for synthesis with the template. In this case, the imaging device 10 may be adapted to produce only a panoramic image having a reduced accuracy for display purpose.

The steps taken in the above imaging method may be configured to be an imaging program for causing a computer to execute the steps of the imaging method described above, or may be configured to be an imaging program enabling computers to function as means for executing the respective steps of the imaging method or to function as means for forming components of the imaging device described above.

Further, the above imaging program may be configured in the form of a computer readable medium or a computer readable memory encoding a program for causing a computer to execute the steps of the imaging method described above.

While the imaging device, imaging method, and a computer-readable medium or memory encoding a program according to the invention have been described in detail above, the present invention is not limited to the above embodiments, and various modifications may be made without departing from the spirit and scope of the invention.

What is claimed is:

1. An imaging device comprising:
   a template selector that selects a template;
   a synthesis area selector that selects a synthesis area for a panoramic image in the selected template;
   an imaging unit that acquires moving images;
   a movement detector that detects a movement of said imaging device and outputs the detected movement as movement information;
   a panoramic image producer that produces a panoramic image being a still image corresponding to said synthesis area for the panoramic image based on the moving images and the detected movement of said imaging device;
   a synthesized image producer that sequentially synthesizes the panoramic image that is being produced into the synthesis area for the panoramic image during acquisition of the moving images to produce and renew a synthesized image;
   a display unit that sequentially displays the synthesized image that is the panoramic image produced and renewed on a display screen during acquisition of the moving images;
   a template corrector,
   wherein when the acquisition of the moving images is terminated with a length of the panoramic image in a production direction less than a length of the synthesis area in the production direction, the template is corrected by the template corrector, and
   wherein when the generated panoramic image is larger or smaller than the synthesis area for the panoramic image in the selected template, the template corrector corrects the template so as to suit the generated panoramic image, the synthesized image producer produces and renews the synthesized image with the corrected template; and
   a storage unit that stores the template and one or more of the moving images, the panoramic image, and the synthesized image.

2. The imaging device according to claim 1, wherein said display unit displays the moving images and the synthesized image in the template.

3. The imaging device according to claim 1, wherein when a length of the panoramic image in a production direction coincides with a length of the synthesis area, the acquisition of the moving images by said imaging unit and production of the panoramic image by said panoramic image producer are terminated.

4. The imaging device according to claim 1, wherein when a length of the panoramic image in a production direction exceeds a length of the synthesis area, a newly produced image is added on said display screen to a first side of the synthesis area opposite to a second side of the synthesis area from which the acquisition of the moving images has been started, and the panoramic image having a same width as the newly produced image that is added is removed on said display screen from the second side of the synthesis area from which the acquisition of the moving images has been started to display the panoramic image as shifted in the synthesis area.

5. The imaging device according to claim 1, wherein when a length of the panoramic image in a production direction exceeds a length of the synthesis area, the panoramic image that is being produced is displayed in a reduced size with a fixed pixel aspect ratio.

6. The imaging device according to claim 1, wherein the template is so corrected that the length of the synthesis area in the production direction is reduced to a same length as the panoramic image and a new synthesis area is added.

7. The imaging device according to claim 1, wherein the template is so corrected that the synthesis area is moved to a center of the template in the production direction of the panoramic image.

8. The imaging device according to claim 1, wherein when a production direction of the panoramic image is changed, a shape of the synthesis area is changed according to the changed production direction.

9. The imaging device according to claim 1, wherein imaging assist in acquiring the panoramic image is provided by displaying on said display screen of said display unit a message or an arrow to indicate a production direction of the panoramic image.

10. The imaging device according to claim 1, wherein a position for starting the acquisition of the panoramic image is set by selecting a side normal to a production direction in the synthesis area or selecting a neighborhood of the side.

11. The imaging device according to claim 1, wherein one or more of the template selected by said template selector and the synthesis area selected by said synthesis area selector are selected through an input unit.

12. An imaging method, comprising:
    a template selecting step of selecting a template;
    a synthesis area selecting step of selecting a synthesis area for a panoramic image in the selected template;
    an imaging step of acquiring moving images with an imaging unit;
    a movement detecting step of detecting a movement of an imaging device having said imaging unit and outputting the detected movement as movement information;
    a panoramic image producing step of producing a panoramic image being a still image corresponding to the synthesis area for the panoramic image based on the moving images and the detected movement of said imaging device;
    a synthesized image producing step of sequentially synthesizing the panoramic image that is being produced into the synthesis area for the panoramic image during acquisition of the moving images to produce and renew a synthesized image;
    a displaying step of sequentially displaying the synthesized image that is the panoramic image produced and renewed during acquisition of the moving images;
    a step of correcting the template to a corrected template, wherein when the acquisition of the moving images is terminated with a length of the panoramic image in a production direction being less than a length of the synthesis area in the production direction, the template is corrected such that when the generated panoramic image is larger or smaller than the synthesis area for the panoramic image in the selected template, the template is corrected so that the corrected template suits the generated panoramic image, with the synthesized image producing step producing and renewing the synthesized image with the corrected template; and a storing step of storing the template and one or more of the moving images, the panoramic image, and the synthesized image.

13. A non-transitory computer-readable medium or memory encoding a program for causing a computer to execute the steps of the imaging method according to claim 12.

14. An imaging device, comprising:

a template selector that selects a template;

a synthesis area selector that selects a synthesis area for a panoramic image in the selected template;

an imaging unit that acquires moving images;

a movement detector that detects a movement of said imaging device and outputs the detected movement as movement information;

a panoramic image producer that produces a panoramic image being a still image corresponding to said synthesis area for the panoramic image based on the moving images and the detected movement of said imaging device;

a synthesized image producer that sequentially synthesizes the panoramic image that is being produced into the synthesis area for the panoramic image during acquisition of the moving images to produce and renew a synthesized image;

a display unit that sequentially displays the synthesized image that is the panoramic image produced and renewed on a display screen during acquisition of the moving images;

a template corrector that corrects the template as the moving images are being acquired to account for varying image acquisition conditions during image acquisition, wherein with an image acquisition starting at a first end of the synthesis area of the template, when a subject becomes taller as that the synthesis image approaches an opposite, second end of the template, i) an original synthesis area is expanded upwardly so that such a shape of a corrected synthesis area is changed according to a production direction, and ii) when the corrected synthesis area overlaps with another synthesis area, the another synthesis area is removed to display the overlapping corrected synthesis area and the panoramic image, the panoramic image having a varying height in the production direction; and a storage unit that stores the template and one or more of the moving images, the panoramic image, and the synthesized image.

* * * * *